United States Patent
North et al.

(10) Patent No.: US 10,274,977 B2
(45) Date of Patent: Apr. 30, 2019

(54) ACTIVE PROPORTIONAL-INTEGRAL-DERIVATIVE (PID) GAIN TUNING FOR CONTROLLING A COOLING SYSTEM FOR AN INFORMATION HANDLING SYSTEM

(71) Applicant: Dell Products L.P., Round Rock, TX (US)

(72) Inventors: Travis North, Cedar Park, TX (US); Chris Helberg, Austin, TX (US); Austin Shelnutt, Leander, TX (US); Kevin Locke, Georgetown, TX (US); Joohyun Woo, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 59 days.

(21) Appl. No.: 15/466,453

(22) Filed: Mar. 22, 2017

(65) Prior Publication Data
US 2018/0275696 A1 Sep. 27, 2018

(51) Int. Cl.
*G05D 23/00* (2006.01)
*G05D 23/19* (2006.01)
*G05B 19/048* (2006.01)

(52) U.S. Cl.
CPC ....... *G05D 23/1917* (2013.01); *G05B 19/048* (2013.01); *G05B 2219/42033* (2013.01)

(58) Field of Classification Search
CPC ....................................................... G06F 1/206
USPC ....................................................... 700/300
See application file for complete search history.

(56) References Cited

U.S. PATENT DOCUMENTS

| | | | |
|---|---|---|---|
| 5,587,899 A * | 12/1996 | Ho | G05B 13/024 700/37 |
| 6,142,078 A * | 11/2000 | Lachajewski | B41F 33/0045 101/211 |
| 7,346,403 B2 * | 3/2008 | Tanaka | G05B 11/42 700/28 |
| 8,706,463 B2 * | 4/2014 | Dykstra | E21B 43/04 166/255.1 |
| 9,823,636 B2 * | 11/2017 | Shabbir | G05B 15/02 |
| 2014/0233176 A1 | 8/2014 | Montero | |
| 2016/0274629 A1 * | 9/2016 | Lovicott | G06F 1/206 |
| 2018/0032114 A1 * | 2/2018 | Hovis | G05B 15/02 |

* cited by examiner

*Primary Examiner* — Suresh Suryawanshi
(74) *Attorney, Agent, or Firm* — Norton Rose Fulbright US LLP (57) ABSTRACT

Control signals, such as PWM control signals, can be used to control aspects of a cooling system and can be generated using proportional-integral-derivative (PID) control. PID control systems for cooling systems are designed based on default environmental and system characteristics and pre-programmed for operation prior to delivery to customers or end users. Changes in environmental and system characteristics, such as component aging, environmental variations, and variation in manufacturing from system to system, such as heat sink effectiveness and application of thermal pastes, can impact system level performance of the control system. Adjusting gain parameters for the P, I, and D components of a PID control signal can reduce negative impact on system performance resulting from such changes and allow the control system to better adjust to external factors.

18 Claims, 6 Drawing Sheets

ACTIVE PROPORTIONAL-INTEGRAL-DERIVATIVE (PID) GAIN TUNING FOR CONTROLLING A COOLING SYSTEM FOR AN INFORMATION HANDLING SYSTEM

FIELD OF THE DISCLOSURE

The instant disclosure relates to information handling system cooling systems. More specifically, portions of this disclosure relate to active tuning of PID gain parameters of control systems for information handling system cooling systems.

BACKGROUND

As the value and use of information increase, individuals and businesses seek additional ways to process and store information. One option available for such a purpose is the information handling system. An information handling system generally processes, compiles, stores, and/or communicates information or data for business, personal, or other purposes thereby allowing users to take advantage of the value of the information. Because technology and information handling requirements vary between different users or applications, information handling systems may also vary regarding what information is handled, how the information is handled, how much information is processed, stored, or communicated, and how quickly and efficiently the information may be processed, stored, or communicated. Variations in information handling system build and capabilities allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As processors, graphics cards, random access memory (RAM), and other components in information handling systems increase in clock speed and power consumption, the amount of heat produced by such components as a byproduct of normal operation has also increased. The temperatures of these components should be kept within a reasonable range to prevent overheating, instability, malfunction, damage, reduced performance, and shortened component lifespan. Accordingly, cooling systems, which may include cooling fans, blowers, and liquid cooling systems, are included in information handling systems to cool information handling systems and their components.

Components of cooling systems, such as cooling fans, can be controlled by a proportional-integral-differential (PID) closed-loop control system. Typical PID closed-loop control is based on a mathematical equation summing proportional, integral, and differential terms of a variable (e.g., cooling fan speed, system temperature, component temperature) being controlled. A controller may be used to generate and output a signal, such as a PID control signal, for control of cooling system components, such as cooling fans, in order to keep system parameters within a desired range. The proportional (P) term may be proportional to the magnitude of the error of the output of the controller, the error being the difference between the current output and a desired output. The P term can help to maintain the variable close to a set value of the variable being controlled in steady state, such as maintaining a temperature of an information handling system at a set level. The integral (I) term may be proportional to the magnitude of the error of the output of the controller and the duration of the error. The I term can help to maintain stability when sudden changes in the variable occur at steady state, such as sudden spikes or drops in system temperature. The derivative (D) term may be proportional to the slope of the error of the output over time. The D term can improve settling time and stability of the PID control system.

The effectiveness of a PID controller in an information handling system cooling system can be affected by changes in system characteristics such as the environment, age, and condition of the information handling system. For example, a PID controller of an information handling system that has been in operation for several years may become less effective due to accumulation of dust within an information handling system or aging of system components. The effectiveness of a PID controller of an information handling system cooling system may also be affected by aspects the environment in which the system is implemented, such as temperature, humidity, or blockage of openings in the information handling system.

Shortcomings mentioned here are only representative and are included simply to highlight that a need exists for improved cooling control systems, particularly for cooling control systems employed in information handling systems, such as data centers and personal computing devices. Embodiments described herein address certain shortcomings but not necessarily each and every one described here or known in the art. Furthermore, embodiments described herein may present other benefits than, and be used in other applications than, those of the shortcomings described above.

SUMMARY

Control signals, such as PWM control signals, can be used to control aspects of a cooling system and can be generated using proportional-integral-derivative (PID) control. PID control systems for cooling systems are designed based on default environmental and system characteristics and pre-programmed for operation prior to delivery to customers or end users. Changes in environmental and system characteristics, such as component aging, environmental variations, and variation in manufacturing from system to system, such as heat sink effectiveness and application of thermal pastes, can impact system level performance of the control system. Adjusting gain parameters for the P, I, and D components of a PID control signal can reduce negative impact on system performance resulting from such changes and allow the control system to better adjust to external factors. For example, a gain of the P, I, and D elements of the PID control signal can be adjusted based on a lumped capacitance thermal model to tune the elements to the current system conditions. PID controller performance given a present thermal condition of the system can be simulated for several sets of possible gain parameters. An effective set of PID control gain parameters can be selected from the sets of possible gain parameters based on results of the simulation such as maximum system temperature, fan speed, and fan ramp rate.

A PID gain parameter of a PID controller of an information handling system cooling system may be adjusted upon detection of a control update event. One or more gain parameters, including the P, I, and/or D gain parameters of a PID controller may be adjusted. The adjustment may be based on a system parameter of the information handling system, such as a component temperature, an ambient temperature of the information handling system, a thermal resistance, capacitance, or time constant of the information handling system, or other value indicative of the environment and condition of the system. An update of a PID gain parameter may be triggered by a variety of control update events such as an initial system boot, a predetermined amount of time elapsing following a previous update of the PID gain parameter, or detection of a deviation of a PID controller performance parameter from a predetermined range. A PID controller performance parameter may include at least one of an overshoot, a steady state gain, and a rise time of the PID controller.

A lumped capacitance modeling algorithm may be used in adjusting the PID gain parameter. A thermal time constant, thermal resistance, and/or thermal capacitance may be determined for the information handling system being cooled. Then, performance of the cooling system may be modeled for a number of potential PID gain parameters based on the thermal time constant, thermal resistance, and/or thermal capacitance. Modeling the performance of the cooling system may include calculating a maximum temperature parameter that the information handling system is expected to reach, a maximum fan speed, and/or a ramp rate for each of the potential gain parameters.

A new PID gain parameter may be selected from among the potential PID gain parameters based on the modeled cooling performance. For example, the new PID gain parameter may be selected based on a comparison of the maximum temperature parameter of the selected gain parameter with a maximum temperature threshold parameter. Likewise, the maximum fan speed parameter and ramp rate results may be compared with thresholds in selecting the new PID gain parameter or based on a comparison of the maximum fan speed parameters and ramp rate results of the other potential PID gain parameters. When the new PID gain parameter is selected, it may be applied to the PID controller to improve the control of the information handling system cooling system.

An apparatus for controlling a cooling system of an information handling system may include at least one cooling fan and a controller coupled to the at least one cooling fan to control the at least one cooling fan. The controller may be configured to perform steps corresponding to those described above.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

An information handling system may provide a controlled environment, such as a data center, a personal computer enclosure, or a mobile device enclosure, that may be monitored, and cooling systems may be controlled to regulate environmental conditions inside the information handling system to certain specifications. Furthermore, cooling systems may be controlled to regulate temperatures of specific system components of information handling systems. For example, a temperature and/or a humidity of the information handling system or a system component may be monitored and the cooling systems controlled, such as by activating, de-activating, and adjusting operating parameters thereof, to keep the temperature and/or the humidity in a desired range. Further, conditions outside the device may be monitored and used as part of a control system for the cooling systems.

Figure 1:
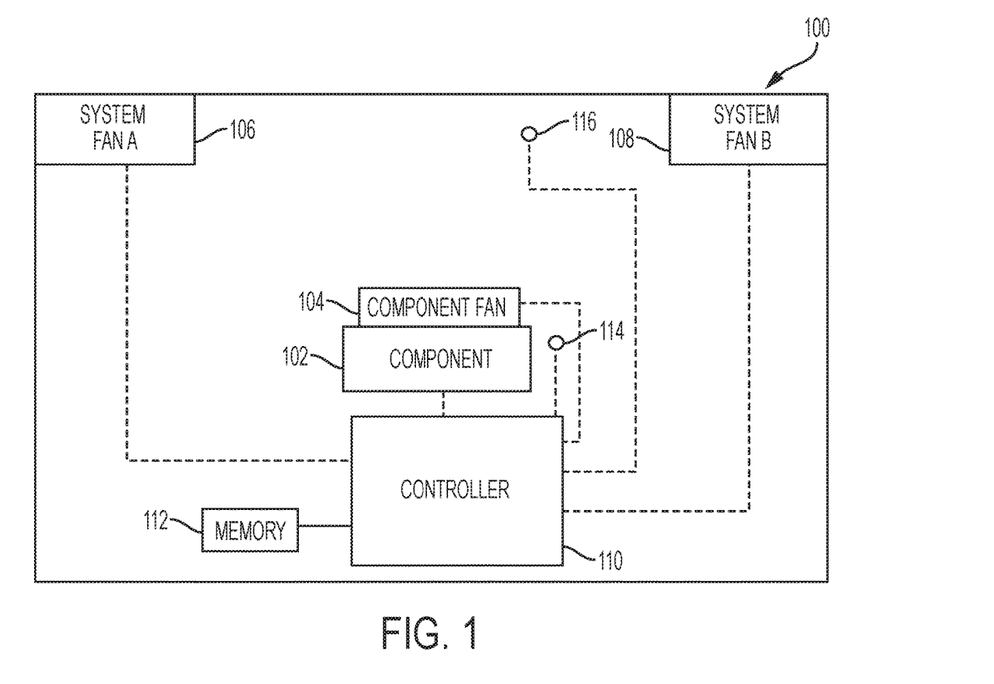
FIG. 1 is a block diagram illustrating a cooling system for an information handling system.

A cooling system for an information handling system 100, illustrated in FIG. 1, may include a number of components useful for regulating the temperature of an information handling system and components within the system, such as component 102, which may be a CPU, memory, video card, controller, or other system component. Both system fans, such as system fan A 106 and system fan B 108, and component fans, such as component fan 104, may be used for cooling system components such as component 102 and an information handling system as a whole. Component fans may include CPU fans, memory fans, video card fans, controller fans, and the like. When a temperature sensor such as ambient temperature sensor 116 or component temperature sensor 114, reads an increase in temperature, a controller, such as controller 110, may generate a control signal, such as a PWM control signal or other control signal, for a variety of system and component fans, such as system fan A 106, system fan B 108, and component fan 104, to compensate for the increase in temperature. The controller 110 may be a programmable logic controller (PLC) or microprocessor and may include a PID controller. The controller may be coupled to a memory 112 for storing information about the component 102 and the system such as temperature and fan control parameters and data.

Alternatively or additionally, a cooling system for an information handling system 100 may include a water cooling system. The water cooling system may include a network of tubes to allow water to flow near to and cool the component 102, a pump to cause the water to flow through the network, and a radiator with at least one fan to control the temperature of the water. If a temperature sensor such as ambient temperature sensor 116 or component temperature sensor 114 reads an increase in temperature, a controller such as controller 110 may generate a control signal for the liquid cooling system to compensate for the increase in temperature. The control signal may control the flow rate of water through the water cooling system by controlling a speed of the pump and/or the temperature of the water by controlling a speed of the at least one fan of the radiator.

PID controllers may be used in fan or liquid cooling control for information handling system cooling systems. PID control may operate to prevent a process value, such as component temperature or system temperature from exceeding a target process value, such as a target component or system temperature or maximum component or system temperature. An error, such as a difference between a target process value and process value, may be used in calculating the P, I, and D components of the PID control signal for generation of the PID control signal. A gain applied to the P, I, and D components of a PID control signal may be set based on the design of the information handling system and default system and environmental conditions. However, performance of the cooling system and the PID controller therein may vary based on a variety of factors related to the environment and internal characteristics of the information handling system. For example, accumulation of dust and other detritus within the information handling system may alter the performance of the cooling system by blocking the flow of air generated by the cooling system. An information handling system may be placed in a position where airflow in and out of the system, such as output from a system exhaust, is inhibited by external objects such as a wall. The effectiveness of a cooling system for an information handling system may degrade over time as components age and/or lose functionality. Effectiveness of information handling system cooling systems can also vary due to variations in build from system to system that occur as a result of normal manufacturing procedures. An information handling system may be placed in a warm and humid environment or a cool and dry environment, further affecting cooling system performance. Such environmental and system characteristics may be indicated by a system parameter of an information handling system which may be a temperature of a component, an ambient temperature of the information handling system, a thermal resistance, capacitance, or time constant of the information handling system, or other value indicative of the environment and condition of the system.

Figure 2:
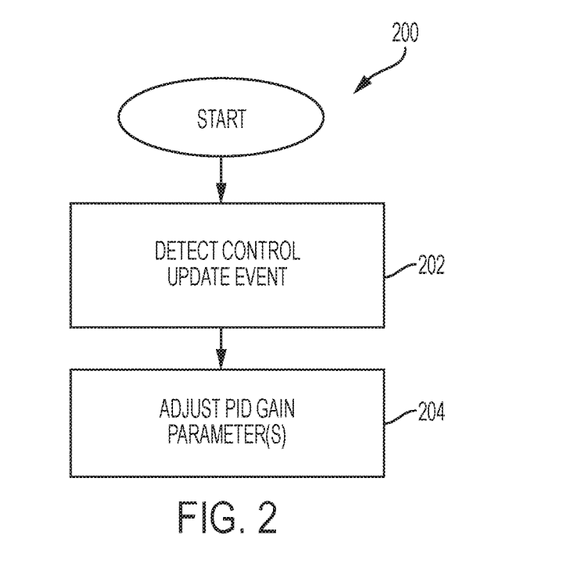
FIG. 2 is a flow chart illustrating an example method of adjusting one or more gain parameters of a PID controller in response to an event according to some embodiments of the disclosure.

The performance impact that such conditions may have on the operation of the cooling system of the information handling system may be addressed, in part, by adjusting one or more gain parameters of a PID controller of the information handling system. Referring to FIG. 2, a method 200 for adjusting a PID gain parameter of an information handling system may begin with detecting a control update event at step 202. After a control update event is detected, a PID gain parameter may be adjusted in response to the control update event. The gain parameter may be adjusted, at step 204, based, at least in part, on a system parameter of the information handling system. The adjustment may be performed by running a PID gain adjustment script that may be stored in system memory. Multiple PID gain parameters, such as gain parameters for the P, I, and D, components of a PID control signal may be adjusted in response to a detected control update event.

Figure 3:
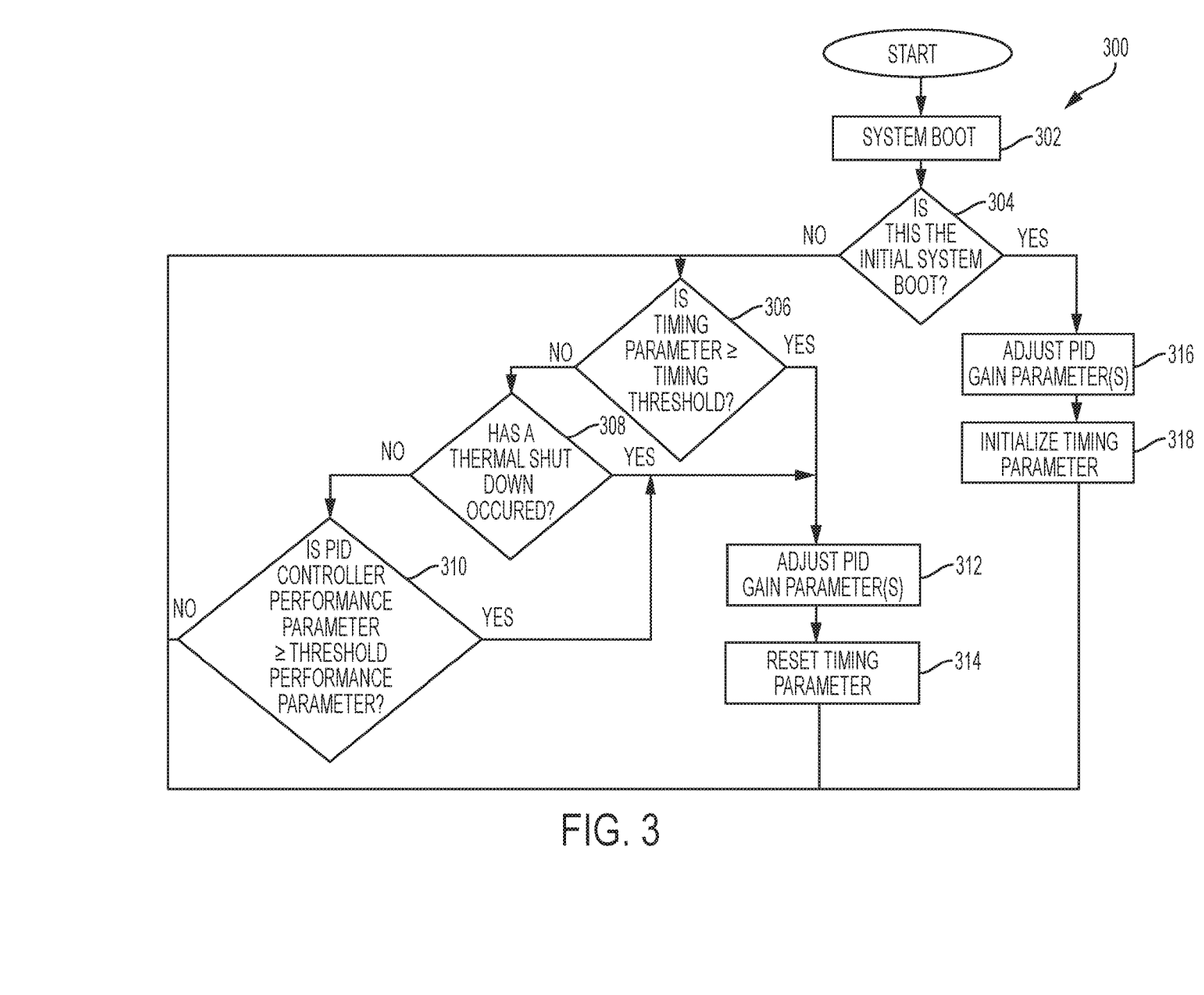
FIG. 3 is a flow chart illustrating an example method of adjusting one or more gain parameters of a PID controller in response to an event according to some embodiments of the disclosure.

Adjustments of a PID gain parameter of a PID controller may be triggered by a variety of control update events. A method 300 for making an adjustment in response to a control update event is illustrated in FIG. 3. The method 300 may begin with a system boot at step 302. A determination may be made of whether the boot is an initial system boot at step 304. For example, a customer may purchase an information handling system and install it. The first time the system boots up may be an initial boot. If the boot is an initial system boot, the method may proceed to step 316 at which the PID gain parameters may be adjusted. At step 318, a timing parameter may be initialized to zero. The timing parameter may be used to determine if a predetermined period of time has passed following the last control update event.

Another possible control update event is the passage of a period of time following a previous control update event. At step 306, a determination may be made of whether a timing parameter is greater than or equal to a timing threshold. For example, a timing parameter may be reset at every control update event and may increase, such as by counting seconds, minutes, hours, clock cycles, or number of reboots, until the next control update event occurs. The timing threshold may be one month or three months. If the timing parameter is greater than the timing threshold, the PID gain parameters may be adjusted at step 312, and the timing parameter may be reset to zero at step 314.

Yet another possible control update event is a thermal shutdown of the system. For example, if a system exceeds a predetermined temperature threshold, the system may shut down in order to avoid overheating and possible thermal damage. At step 308 a determination is made as to whether such a shutdown has occurred. If so, the PID gain parameters may be adjusted at step 312, and the timing parameter may be reset, at step 314.

A number of PID performance parameters may be analyzed in order to determine whether to update a PID gain parameter. For example, performance parameters of the PID control signal may include an overshoot of the PID control signal, a steady state gain of the PID control signal, and a rise time of the PID control signal. At step 310, a determination may be made as to whether a PID controller performance parameter has exceeded a threshold performance parameter. Alternatively, a determination may be made as to whether a PID controller performance parameter has deviated from a predetermined range or has fallen below the threshold performance parameter. If so, the PID gain parameter may be adjusted at step 312, and the timing parameter may be reset at step 314. If not, the PID gain parameter may remain unchanged.

The method 300 may be repeated periodically or in response to an event. For example, repetition of the method 300 may be triggered manually by a user or may be repeated weekly. Alternatively or additionally, the system may continuously compare at least one of the PID performance parameters to a default value, determined in design of the system, or an initial value, determined upon an initial boot up of the system, of the PID performance parameter and may update the PID gain parameters if the PID performance parameter exceeds the default or initial value of the PID performance parameter by a predetermined amount.

Figure 4:
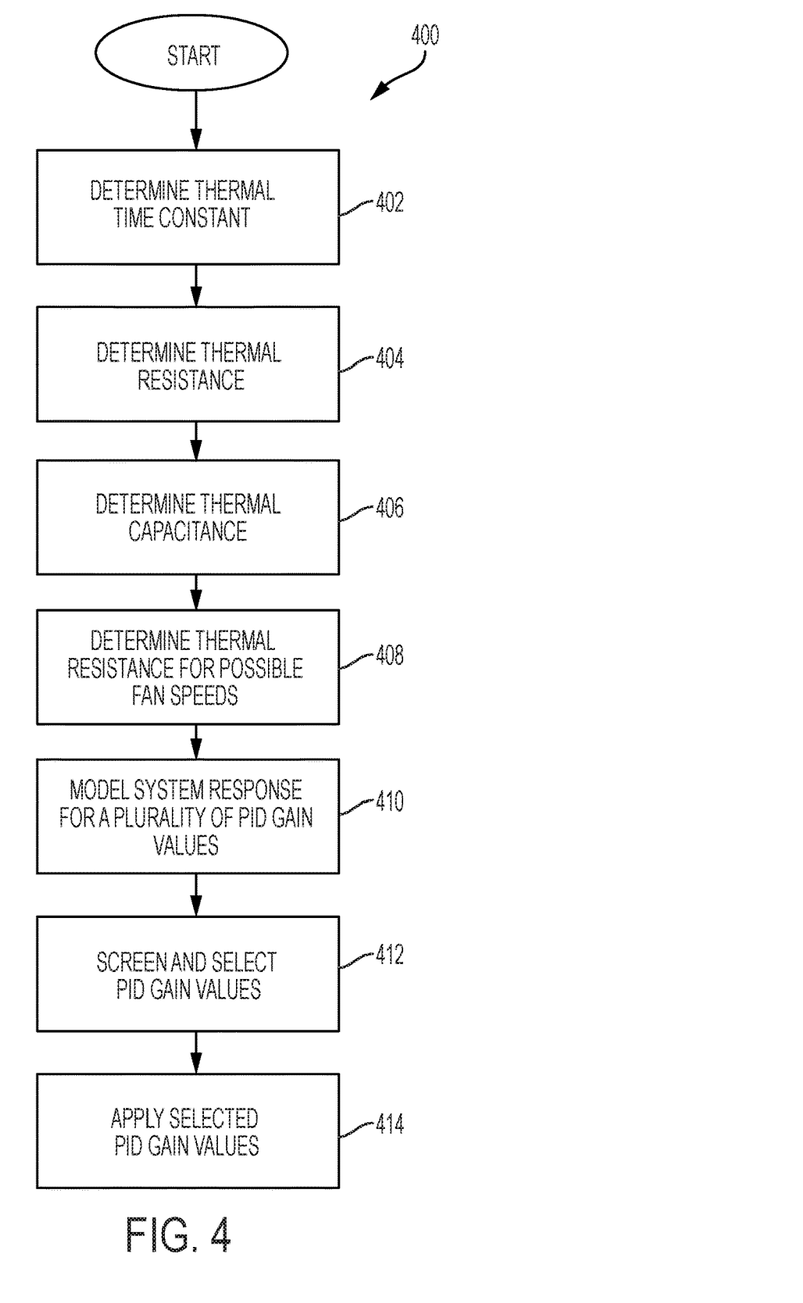
FIG. 4 is a flow chart illustrating an example method of adjusting one or more gain parameters of a PID controller according to some embodiments of the disclosure.
Figure 5:
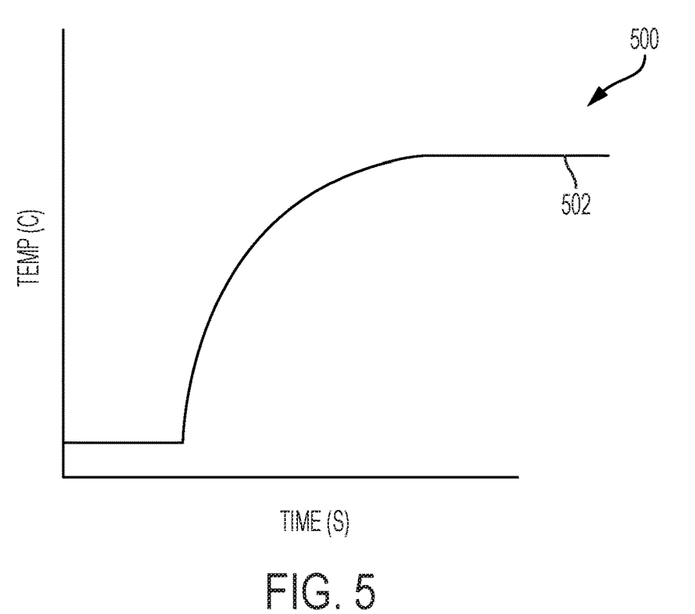
FIG. 5 is a graph illustrating a temperature of an information handling system over time.

One method for determining adjustment to the PID gain parameters is to execute a model of the cooling system. For example, a lumped capacitance thermal model may be executed to select gain parameters that will provide an information handling system with sufficient cooling. A method 400 for adjusting PID control gain parameters, as described with respect to FIG. 4, may begin with determining a thermal time constant at step 402. A thermal resistance may also be determined at step 404. The thermal time constant and thermal resistance may be determined by running and analyzing a transient model of the thermal properties of the information handling system. For example, a speed of one or more fans of an information handling system may be increased to cool the information handling system. The fans may then be deactivated to allow the temperature to rise rapidly creating a transient temperature response. FIG. 5 is a graph 500 with a line 502 illustrating a temperature of the information handling system over time, that may be generated by a transient model of the thermal properties of the information handling system. A thermal time constant may be determined by multiplying 0.632 by the rate of change in temperature over time, and a thermal resistance may be determined by dividing the difference between a junction temperature value of the information handling system and an ambient temperature value of the information handling system by a power value of the information handling system. A thermal capacitance may then be determined, at step 406, by dividing the thermal time constant by the thermal resistance.

Figure 6:
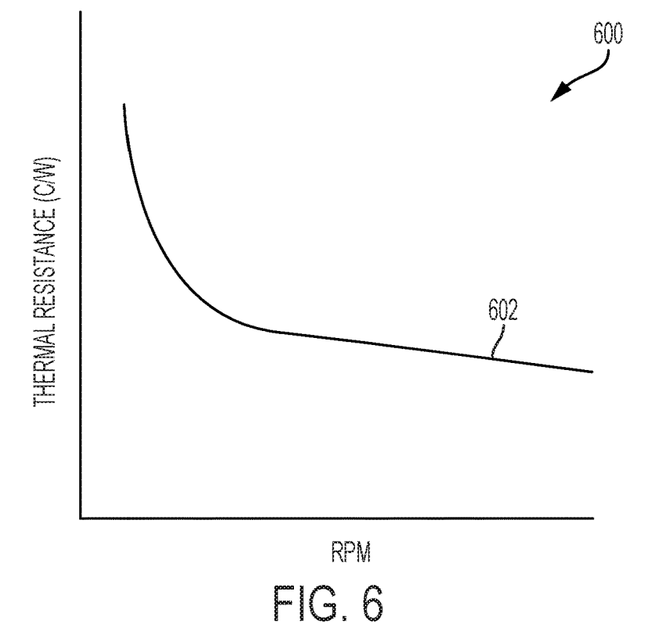
FIG. 6 is a graph illustrating a relationship between thermal resistance and fan speed of an information handling system.

Thermal resistances at a range of possible fan speeds may be determined at step 408. The calculation may be based on at least one of the determined thermal time constant, resistance, and capacitance. FIG. 6 is a graph 600 with a line 602 illustrating a thermal resistance of the information handling system over a range of possible fan speeds. The relationship between thermal resistance and fan speed may change based on system condition and environment. For example, blockage of a system vent or aging of system components could cause the thermal resistance at various fan speeds to increase.

System responses for a range of possible PID gain parameter values may then be dynamically modeled at step 410. The dynamically modeled system response may be a response of a fan speed to a temperature step function, and the range of possible PID gain parameter values may be randomly selected. System responses may be modeled based on groupings of multiple PID gain parameters, such as P, I, and D gain parameters. The modeled system response may indicate a predicted performance of the system given the PID gain parameter value and may be stored in a temporary memory such as system memory. Cooling system performance parameters, such as maximum temperature, fan speed, and fan ramp rate, may be calculated either in the process of modeling the system response or based on the system response. The possible PID gain parameters may be screened based on their respective modeled responses, and a PID gain parameter may be selected for application to the PID gain controller at step 412. The selected PID gain parameter may then be applied to the PID controller at step 414. In applying the selected PID gain parameter the selected PID gain parameter value may be stored in non-volatile memory of the information handling system such as an EEPROM or hard drive. As described with respect to FIG. 3, the method 400 may be repeated periodically or in response to an event.

Figure 7:
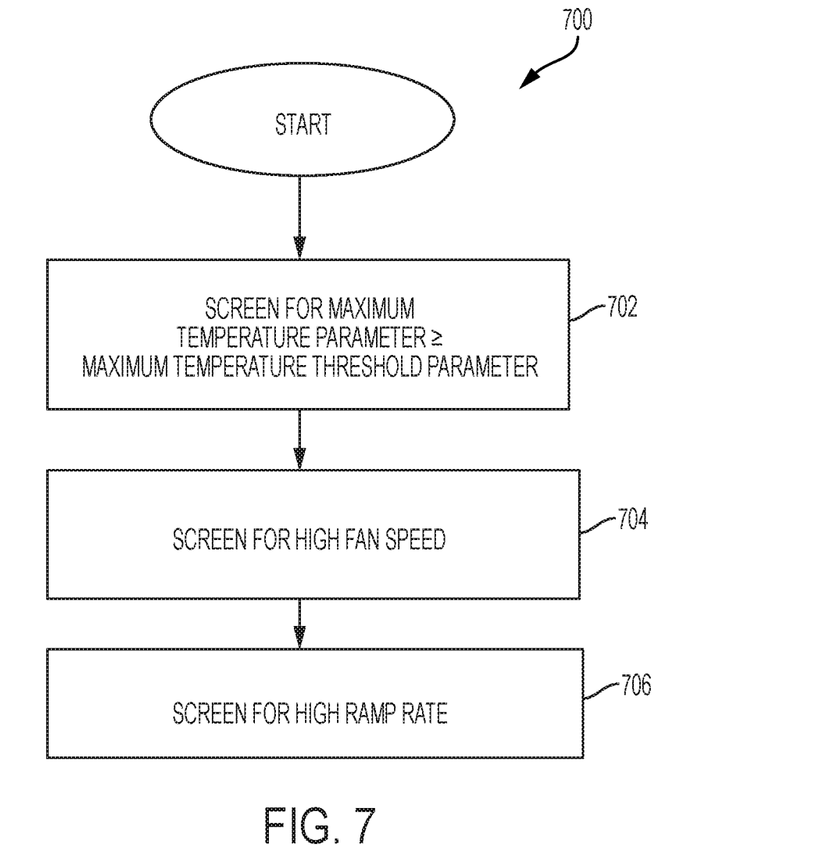
FIG. 7 is a flow chart illustrating a method for selecting a new PID gain parameter for application to an information handling system according to some embodiments of the disclosure.

FIG. 7 shows a method 700 for screening PID gain parameter values based on cooling system performance parameters derived from a modeled system response. At step 702, the PID gain parameter values are screened to determine whether a maximum temperature of the information handling system would exceed a temperature set point if the gain parameters were applied. The gain parameters, or sets of gain parameters, for which there is a possibility of temperature exceeding the temperature set point may be excluded from selection. The remaining gain parameters may then be screened based on fan speed at step 704. The fan speed used may, for example, be an average fan speed over a range of possible temperature values or a maximum fan speed that could be reached were the gain parameters applied. The gain parameters with a higher fan speed may be excluded from selection. At step 706, the remaining PID gain parameters may be screened based upon a fan ramp rate of the information handling system cooling system if the PID gain parameters were to be applied. The fan ramp rate may, for example, be a maximum fan ramp rate or an average fan ramp rate over a range of possible temperature values. After the possible PID gain parameter values are filtered through blocks 702, 704, and 706, one of the remaining PID gain parameter values may be selected and applied, as described with reference to step 414 of FIG. 4.

Figure 8:
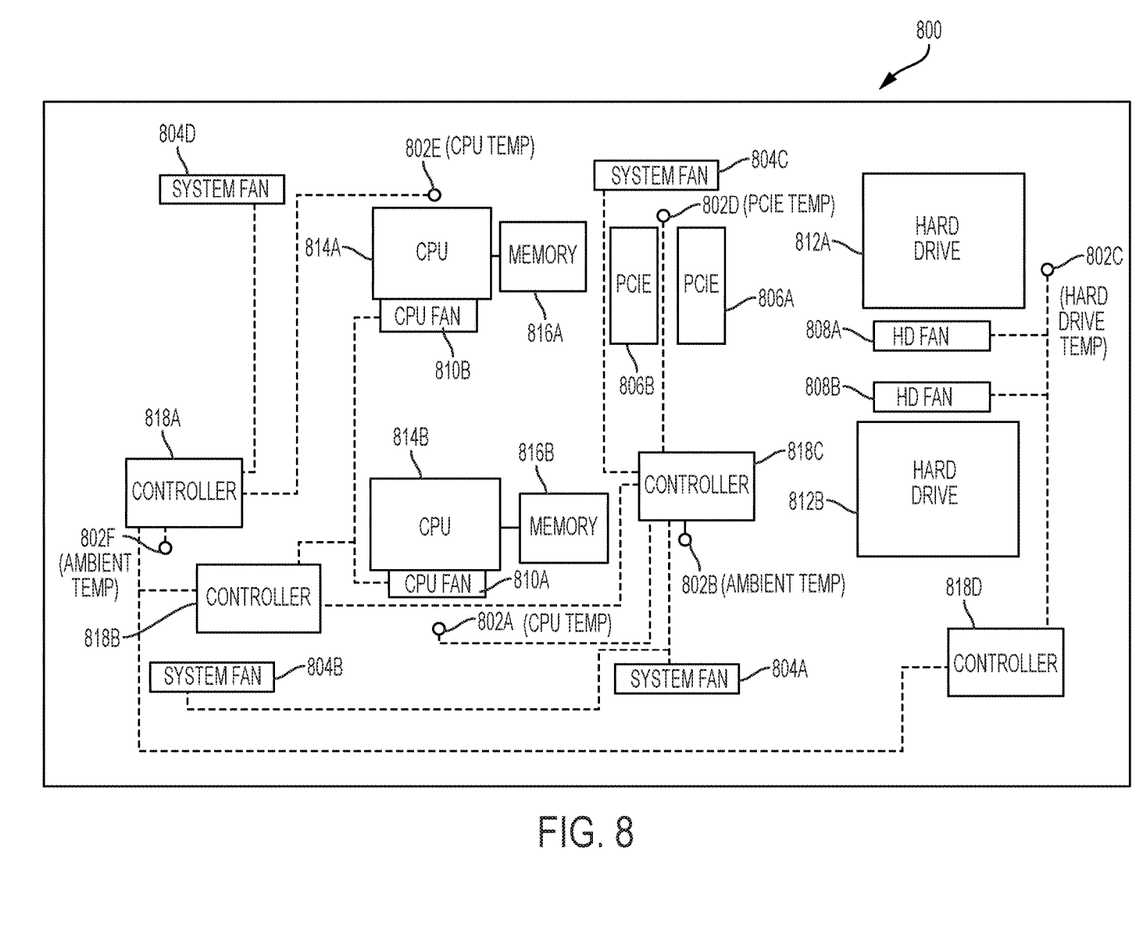
FIG. 8 is a block diagram illustrating an information handling system according to some embodiments of the disclosure.

FIG. 8 is a block diagram illustrating an information handling system 800 according to some embodiments of the disclosure. An information handling system 800 may include sensors for collecting data as to the environment of the information handling system, such as temperature sensors 802A-F. The system 800 may also include system cooling fans such as system fans 804A-D, and component cooling fans such as CPU fans 810A-B and hard drive fans 808A-B. The system 800 may include one or more system components such as CPUs 814A-B, hard drives 812A-B, peripheral component interconnect express (PCIe) peripherals 806A-B, such as video cards, and memory units 816A-B. The system 800 may also include controllers, such as controllers 818A-D. The controllers 818A-D may receive data from the sensors in the form of process values. The controllers 818A-D may generate, adjust, and/or filter control signals for control of the system and component fans based, at least in part on the data obtained from the temperature sensors. For example, PID gain parameter values of a PID controller for generating control signals for cooling fans may be adjusted based on data collected from temperature sensors 802A-F. Such adjustments may be performed by one or more discrete microcontrollers for running fans such as controllers 818A-D or may be made by the CPU, such as CPUs 814A-B, in an operating system level cooling system driver package. Controllers 818A-D may be contained in a single chip configuration or may be located on separate chips. Controller 818B may be a master controller and may control operation of controllers 818A and 818C-D.

The schematic flow chart diagrams of FIGS. 2-4 and FIG. 7 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for controlling a cooling system of an information handling system, comprising:
   detecting a control update event;
   adjusting a proportional-integral-derivative (PID) gain parameter of a PID controller of the cooling system in response to the event based, at least in part, on a system parameter of the information handling system; and
   generating a control signal for at least one cooling fan based, at least in part, on the adjusted PID gain parameter,
   wherein the step of adjusting the PID gain parameter of the PID controller of the cooling system comprises:
      determining a thermal time constant, thermal resistance, and thermal capacitance for the information handling system;
      modeling a cooling system performance for the cooling system for a plurality of potential PID gain parameters based, at least in part, on the determined thermal time constant, thermal resistance, and thermal capacitance;
      selecting a new PID gain parameter for application to the PID controller from the plurality of potential PID gain parameters based, at least in part, on the modeled cooling system performance; and
      applying the new PID gain parameter to the PID controller.

2. The method of claim 1, wherein the step of detecting a control update event comprises detecting an initial boot.

3. The method of claim 1, wherein the step of detecting a control update event comprises determining an elapsed time since a last control update is greater than a timing threshold.

4. The method of claim 1, wherein detecting a control update event comprises detecting a deviation of a PID controller performance parameter from a predetermined range.

5. The method of claim 4, wherein the PID controller performance parameter comprises at least one of an overshoot, a steady state gain, and a rise time of the PID controller.

6. The method of claim 1, wherein the step of adjusting comprises applying a lumped capacitance modeling algorithm to adjust the PID gain parameter.

7. The method of claim 1, wherein the step of modeling the cooling system performance comprises:
   calculating a maximum temperature parameter for the cooling system for each of the plurality of potential PID gain parameters;
   calculating a maximum fan speed parameter for the cooling system for each of the plurality of potential PID gain parameters; and calculating a ramp rate for the cooling system for each of the plurality of potential PID gain parameters.

8. The method of claim 7, wherein the step of selecting the new PID gain parameter comprises selecting the new PID gain parameter from the plurality of potential gain parameters based, at least in part, on:
- a comparison of the maximum temperature parameter of the new gain parameter with a maximum temperature threshold parameter;
- a comparison of the maximum fan speed parameter of the new gain parameter with at least one maximum fan speed parameter of at least one other gain parameter of the plurality of potential gain parameters; and
- a comparison of the ramp rate of the new gain parameter with at least one ramp rate of at least one other gain parameter of the plurality of potential gain parameters.

9. An apparatus for controlling a cooling system of an information handling system, comprising:
- a controller configured to perform steps comprising:
  - detecting a control update event;
  - adjusting a proportional-integral-derivative (PID) gain parameter of a PID controller of the cooling system in response to the event based, at least in part, on a system parameter of the information handling system; and
  - generating a control signal for at least one cooling fan based, at least in part, on the adjusted PID gain parameter,
  - wherein the step of adjusting the PID gain parameter of the PID controller of the cooling system comprises:
    - determining a thermal time constant, thermal resistance, and thermal capacitance for the information handling system;
    - modeling a cooling system performance for the cooling system for a plurality of potential PID gain parameters based, at least in part, on the determined thermal time constant, thermal resistance, and thermal capacitance;
    - selecting a new PID gain parameter for application to the PID controller from the plurality of potential PID gain parameters based, at least in part, on the modeled cooling system performance; and
    - applying the new PID gain parameter to the PID controller.

10. The apparatus of claim 9, wherein the step of detecting a control update event comprises detecting an initial boot.

11. The apparatus of claim 9, wherein the step of detecting a control update event comprises determining an elapsed time since a last control update is greater than a timing threshold.

12. The apparatus of claim 9, wherein the step of detecting a control update event comprises detecting a deviation of a PID controller performance parameter from a predetermined range.

13. The apparatus of claim 12, wherein the PID controller performance parameter comprises at least one of an overshoot, a steady state gain, and a rise time of the PID controller.

14. The apparatus of claim 9, wherein the step of adjusting comprises applying a lumped capacitance modeling algorithm to adjust the PID gain parameter.

15. The apparatus of claim 9, wherein the step of modeling the cooling system performance comprises:
- calculating a maximum temperature parameter for the cooling system for each of the plurality of potential PID gain parameters;
- calculating a maximum fan speed parameter for the cooling system for each of the plurality of potential PID gain parameters; and
- calculating a ramp rate for the cooling system for each of the plurality of potential PID gain parameters.

16. The apparatus of claim 15, wherein the step of selecting the new PID gain parameter comprises selecting the new PID gain parameter from the plurality of gain parameters based, at least in part, on:
- a comparison of the maximum temperature parameter of the new gain parameter with a maximum temperature threshold parameter;
- a comparison of the maximum fan speed parameter of the new gain parameter with at least one maximum fan speed parameter of at least one other gain parameter of the plurality of potential gain parameters; and
- a comparison of the ramp rate of the new gain parameter with at least one ramp rate of at least one other gain parameter of the plurality of potential gain parameters.

17. An apparatus for cooling an information handling system, comprising:
- at least one cooling fan; and
- a controller coupled to the at least one cooling fan to control the at least one cooling fan,
- wherein, the controller is configured to perform steps comprising:
  - detecting a control update event;
  - adjusting a proportional-integral-derivative (PID) gain parameter of a PID controller of the cooling system in response to the event based, at least in part, on a system parameter of the information handling system; and
  - generating a control signal for the at least one cooling fan based, at least in part, on the adjusted PID gain parameter
  - wherein the step of adjusting the PID gain parameter of the PID controller of the cooling system comprises:
    - determining a thermal time constant, thermal resistance, and thermal capacitance for the information handling system;
    - modeling a cooling system performance for the cooling system for a plurality of potential PID gain parameters based, at least in part, on the determined thermal time constant, thermal resistance, and thermal capacitance;
    - selecting a new PID gain parameter for application to the PID controller from the plurality of potential PID gain parameters based, at least in part, on the modeled cooling system performance; and
    - applying the new PID gain parameter to the PID controller.

18. The apparatus of claim 17, wherein the step of adjusting comprises applying a lumped capacitance modeling algorithm to adjust the PID gain parameter.

* * * * *